US012639696B2

(12) United States Patent
Levionnais et al.

(10) Patent No.: US 12,639,696 B2
(45) Date of Patent: May 26, 2026

(54) ELECTRICALLY CHARGING A CIRCUIT BOARD

(71) Applicant: Orange, Issy-les-Moulineaux (FR)

(72) Inventors: Philippe Michel Levionnais, Chatillon Cedex (FR); Francois Boudet, Chatillon Cedex (FR)

(73) Assignee: Orange, Issy-les-Moulineaux (FR)

( * ) Notice: Subject to any disclaimer, the term of this patent is extended or adjusted under 35 U.S.C. 154(b) by 784 days.

(21) Appl. No.: 17/773,092

(22) PCT Filed: Oct. 8, 2020

(86) PCT No.: PCT/FR2020/051768
§ 371 (c)(1),
(2) Date: Apr. 29, 2022

(87) PCT Pub. No.: WO2021/084175
PCT Pub. Date: May 6, 2021

(65) Prior Publication Data
US 2023/0011533 A1    Jan. 12, 2023

(30) Foreign Application Priority Data

Oct. 31, 2019    (FR) ...................................... 1912247

(51) Int. Cl.
*H04W 4/80* (2018.01)
*G06Q 20/32* (2012.01)
*H02J 7/42* (2026.01)

(52) U.S. Cl.
CPC ....... *G06Q 20/3278* (2013.01); *G06Q 20/322* (2013.01); *H04W 4/80* (2018.02); *H02J 7/42* (2026.01)

(58) Field of Classification Search
CPC ... G06Q 20/3278; G06Q 20/322; H04W 4/80; H02J 7/00034

(Continued)

(56) References Cited

U.S. PATENT DOCUMENTS

| | | | |
|---|---|---|---|
| 8,358,104 B2 * | 1/2013 | Capomaggio ...... | G06K 19/0702 320/108 |
| 10,542,036 B1 * | 1/2020 | Duane ................. | H04L 63/0853 |

(Continued)

FOREIGN PATENT DOCUMENTS

| | | |
|---|---|---|
| CN | 109408127 A | 3/2019 |
| EP | 2071497 A1 | 6/2009 |
| WO | 2006018229 A1 | 2/2006 |

OTHER PUBLICATIONS

"Identification cards—Contactless integrated circuit(s) cards—Proximity cards—Part 3: Initialization and anticollision", International Standard, ISO/IEC 14443-3, First edition Feb. 1, 2001.

(Continued)

*Primary Examiner* — April G Gonzales
(74) *Attorney, Agent, or Firm* — David D. Brush; Westman, Champlin & Koehler, P.A.

(57) ABSTRACT

A method and a device for making available electric charge in order to charge an electronic card including a near-field communication module by way of a terminal. The terminal has what is known as a reader mode in which it is able to supply power to the card in near-field mode and receive data from the card. The method includes the following steps, on the terminal, set to reader mode, so as to generate an electromagnetic field able to charge such an electronic card: initializing the communication between the terminal and the card; receiving a message from the card, the message containing at least one datum telling the terminal that it should maintain the electric charge; and maintaining the electric charge while remaining in reader mode.

20 Claims, 3 Drawing Sheets

(58) Field of Classification Search
USPC ......................................................... 455/41.1
See application file for complete search history.

(56) References Cited

U.S. PATENT DOCUMENTS

| | | | | | |
|---|---|---|---|---|---|
| 10,819,394 | B1 * | 10/2020 | Petzel | ...................... | H04B 5/79 |
| 11,062,312 | B2 * | 7/2021 | Dunjic | .............. | G06Q 20/3672 |
| 2009/0166421 | A1 * | 7/2009 | Finn | ..................... | G06K 7/0008 235/439 |
| 2009/0291634 | A1 * | 11/2009 | Saarisalo | .......... | H04M 1/72412 455/41.1 |
| 2010/0040114 | A1 * | 2/2010 | Kim | ..................... | H04B 13/005 375/E1.001 |
| 2010/0197224 | A1 * | 8/2010 | Lahdenniemi | ..... | G06Q 20/3278 455/41.1 |
| 2010/0259216 | A1 * | 10/2010 | Capomaggio | .......... | H02J 50/10 320/108 |
| 2011/0174874 | A1 * | 7/2011 | Poznansky | .......... | G06Q 20/347 235/379 |
| 2011/0312271 | A1 * | 12/2011 | Ma | ..................... | G06Q 20/3278 455/41.1 |
| 2012/0021683 | A1 * | 1/2012 | Ma | ..................... | H04L 63/0876 235/492 |
| 2012/0323653 | A1 * | 12/2012 | Fisher | ................. | G06Q 20/425 705/16 |
| 2013/0035037 | A1 * | 2/2013 | Fisher | ............... | G06Q 30/0238 455/41.1 |
| 2013/0157565 | A1 * | 6/2013 | Clement | ................. | H02J 50/10 320/108 |
| 2014/0024391 | A1 * | 1/2014 | Assadi | ................. | G06K 7/0008 455/456.1 |
| 2014/0126782 | A1 * | 5/2014 | Takai | ..................... | G06F 3/013 382/116 |
| 2014/0213184 | A1 * | 7/2014 | Matsubara | ............... | H04B 5/26 455/41.1 |
| 2014/0339315 | A1 * | 11/2014 | Ko | ........................ | G06F 1/1628 235/492 |
| 2015/0012440 | A1 * | 1/2015 | Kelley | ................. | G06K 19/073 705/44 |
| 2015/0249920 | A1 * | 9/2015 | Lestario | ............... | H04W 12/06 455/411 |
| 2016/0197510 | A1 * | 7/2016 | Strömmer | .............. | H04W 4/80 320/108 |
| 2024/0269270 | A1 * | 8/2024 | Anosova | ................. | A61P 31/14 |

OTHER PUBLICATIONS

International Search Report dated Nov. 23, 2020 for corresponding International Application No. PCT/FR2020/051768, Oct. 8, 2020.
Written Opinion of the International Searching Authority dated Nov. 23, 2020 for corresponding International Application No. PCT/FR2020/051768, filed Oct. 8, 2020.
English translation of the Written Opinion of the International Searching Authority dated Dec. 7, 2020 for corresponding International Application No. PCT/FR2020/051768, filed Oct. 8, 2020.

* cited by examiner

ELECTRICALLY CHARGING A CIRCUIT BOARD

CROSS-REFERENCE TO RELATED APPLICATIONS

This Application is a Section 371 National Stage Application of International Application No. PCT/FR2020/051768, filed Oct. 8, 2020, which is incorporated by reference in its entirety and published as WO 2021/084175 A1 on May 6, 2021, not in English.

FIELD OF THE INVENTION

The invention relates in general to telecommunications, and more specifically to contactless communications using short-distance radio technologies, in particular of NFC (Near-Field Communication) type. It applies more particularly to terminals equipped with hardware and software resources including a microprocessor and a near-field (NF) communication module generating an electromagnetic field.

PRIOR ART

Near-field communications, usually called NFC, based mainly on the ISO (International Organization for Standardization) 14443 standard, use wireless technologies to allow information to be exchanged between two peripherals separated by a short distance, typically less than ten centimeters. Communications of this type have many applications in the fields of payment or transport, for example.

New wireless communication techniques using the human body as a channel have recently emerged in this field. In these technologies, which are grouped together under the generic term IBC (for Intra-Body Communication) or else BCC (for Body Channel Communication), the human body also acts as a conductor for transmitting information from one point to another. It is therefore no longer necessary to bring the IBC terminal toward its counterpart in order to establish a communication: it may be kept in a pocket, in a bag, etc. of the carrier.

However, and unlike a conventional NFC card or NFC tag, which is able to be supplied with power by the electromagnetic field of the equipment with which it enters into communication, an IBC card or tag is not able to be supplied with power in this way, since it is at a distance from this equipment, from which it is spaced apart by the body of the carrier.

Such an IBC terminal is therefore generally associated with a mobile terminal so as to benefit from its power supply.

One alternative consists in using an NFC charger to supply power to the IBC card/tag. However, this solution is constrictive and expensive.

There is therefore a need for a very simple autonomous IBC/NFC terminal.

DISCLOSURE OF THE INVENTION

The invention aims to improve the prior art.

To this end, it proposes a method for making available electric charge in order to charge an electronic card comprising a near-field communication module by way of a terminal, the method being characterized in that it comprises the following steps, on the terminal set to near-field reader mode so as to generate an electromagnetic field able to charge such an electronic card:

initializing the communication on a near-field channel between the terminal and the card;

receiving a message from the card, said message containing at least one datum telling the terminal that it should maintain the electric charge;

maintaining the electric charge while remaining in reader mode.

Advantageously according to the invention, it is enough to position the IBC card close to the reader in order to charge or recharge it. When a message is received on the reader in order to tell it that the card needs charging, it maintains the generation of the electromagnetic field able to supply the card with electric current and/or voltage. To achieve this, it is enough for it to maintain near-field communication, even if no application message is exchanged between the terminal and the card.

"Electric charge" is understood to mean the charge generated by the electromagnetic field that supplies power to the card through induction when it is located within the range of the near field of the terminal.

"Making available electric charge" is understood to mean the generation of the electromagnetic field by the terminal, when it is in reader mode (active).

"Electronic card" is understood to mean an electronic card able to communicate with a terminal in near-field mode in order to conduct electronic transactions (payment, transport, etc.) and having its own power supply (battery, cell, etc.).

"Charging" or "recharging" an electronic card is understood to mean charging the power supply (battery, cell, etc.) of the card.

"Terminal" is understood to mean any equipment capable of putting itself in reader mode in order to supply power to a near-field device, for example a smartphone, a tablet, a gate, an EPT (electronic payment terminal), etc.

According to one particular mode of implementation of the invention, the method as described above furthermore comprises the steps of:

obtaining a duration for which the charge should be maintained;

stopping making the charge available at the end of this duration.

Advantageously according to this mode, the terminal obtains the time period for which it should or may make the charge available, for example 3 minutes. Such information may for example be predefined and read from a memory of the terminal, or computed by the terminal on the basis of internal parameters, or received from the card in the message, or in another message, etc.

According to another particular mode of implementation of the invention, which may be implemented in addition or as an alternative to the previous one, the method as described above is furthermore characterized in that it comprises a step of the terminal adapting the charging power that is made available.

Advantageously according to this mode, the terminal may choose to adapt the power delivered for the charge: it may for example stop supplying the charge before the end of the planned duration, or else reduce the instantaneous power, etc.

According to another particular mode of implementation of the invention, which may be implemented as an alternative or in addition to the previous ones, a making-available method as described above furthermore includes the steps of:

obtaining, by the terminal, a command to stop making the charge available;

stopping making the charge available for the card.

This mode of implementation of the invention allows the card to notify the terminal that its recharging has finished, or may be interrupted. The terminal may then deactivate communication with the card, exit reader mode, etc.

In correlation, the invention also proposes a method for electrically charging an electronic card comprising a near-field communication module and a rechargeable battery by way of a terminal set to near-field reader mode, the method being characterized in that it comprises the following steps on the card, when the card is located within the electromagnetic field generated by the terminal:

initializing the communication on a near-field channel between the card and the terminal;

transmitting a message to the terminal, said message containing at least one datum telling the terminal that it should keep making electric charge available;

adapting the received charge in order to charge the battery.

Advantageously according to this method, the IBC card, which is positioned within the field of the terminal, transmits a simple message thereto inviting it to remain in reader mode in order to supply power thereto. Such an operating mode does not exist at present. A conventional NFC card, or tag, may be supplied with power by the electromagnetic field of the equipment with which it enters into communication, but only on the condition that effective communication (an exchange of application data) is established between the card and the terminal. An IBC card or tag cannot be supplied with power in this way because, during communication, it is generally located too far away from the terminal to be within its electromagnetic field (for example, it is in the pocket of the user/carrier).

According to one particular mode of implementation, a charging method as described above furthermore includes the steps of:

obtaining a duration for which the charge should be maintained;

transmitting said duration to the terminal.

Advantageously according to this mode, the card may tell the terminal the amount of time for which it should charge it. This value (for example 5 minutes) may correspond to a predefined datum recorded in the card, or to the result of a computation performed by the card based for example on the remaining charge of its battery, etc.

According to one particular mode of implementation of the invention, the methods as described above are furthermore characterized in that said message is transmitted on a communication channel other than the near-field channel.

Advantageously according to this mode, if the card and the terminal both have a communication module other than the NFC module, they may use a communication channel of this type to exchange data, and in particular the message MSG1. This second channel may for example be a Bluetooth or Wi-Fi, etc. channel. This type of channel in particular affords the advantage of a higher data rate than the near-field channel.

According to one particular mode of implementation of the invention, the methods as described above are furthermore characterized in that said message is transmitted by the card in near-field mode after a reinitialization or in response to an initialization request from the card.

Advantageously according to this mode, the message is transmitted after initialization or reinitialization of the card, so that the terminal immediately knows that it simply has to remain in reader mode in order to supply power to the card, without initiating application communication.

According to one particular mode of implementation of the invention, the methods as described above are furthermore characterized in that said message is transmitted, during ISO 14443-3 communication between the card and the terminal, in a field that has been left free by the standard for future use.

Advantageously according to this mode, an existing standard met by all electronic chip cards on the market is reused. During ISO 14443-3 communication, messages imposed by the standard are exchanged between the card and the terminal on the near-field channel. Although the format of these messages is not free, a certain number of fields have been reserved for future use of the standard. The charging request message may advantageously be exchanged in this way, without interfering with the initialization of the card according to this protocol.

According to one particular mode of implementation of the invention, the methods as described above are furthermore characterized in that said message is transmitted during ISO 14443-4 communication between the card and the terminal.

Advantageously according to this mode, an existing standard met by the majority of electronic chip cards on the market is reused. During ISO 14443-4 communication, following initialization of the card and communication through the corresponding ISO 14443-3 protocol (lower protocol level), messages may be freely exchanged between the card and the terminal (at the application's choice). The charging request message may advantageously be exchanged in this way.

According to one particular mode of implementation of the invention, the methods as described above are furthermore characterized in that the card conforms to Type A of the ISO 14443-3 standard and in that the message is transported in the unique identifier (UID) transmitted by the card.

According to one particular mode of implementation of the invention, the methods as described above are furthermore characterized in that the card conforms to Type B of the ISO 14443-3 standard and in that the message is transported in the application identifier (AFI) or in the application data (ADC) transmitted by the card.

The invention also relates to a terminal comprising a near-field communication device, a memory and a processor that are configured so as, when the terminal is set to reader mode, in order to generate an electromagnetic field able to charge an electronic card comprising a near-field communication module, to:

initialize the communication on a near-field channel between the terminal and the card;

receive a message from the card, said message containing at least one datum telling the terminal that it should maintain the electric charge;

maintain the electric charge while remaining in reader mode.

The invention also relates to an electronic card comprising a near-field communication device, a rechargeable power supply, an adaptation circuit, a memory and a processor that are configured so as to:

initialize the communication on a near-field channel between the card and the terminal;

transmit a message to the terminal, said message containing at least one datum telling the terminal that it should keep making electric charge available; and receive the electric charge; and adapt the received charge in order to charge the battery.

The invention also relates to a system comprising a terminal and an electronic card as described above, wherein the message is exchanged on the near-field channel.

The invention also relates to a system comprising a terminal and an electronic card as described above, wherein the terminal and the electronic card additionally comprise another communication module for establishing a communication channel different from the near-field channel and the message is exchanged on this communication channel different from the near-field channel.

The invention also relates to a computer program comprising instructions for implementing one of the above methods according to any one of the particular embodiments described above when said program is executed by a processor. The method may be implemented in various ways, in particular in hard-wired form or in the form of software. This program may use any programming language and be in the form of source code, object code or intermediate code between source code and object code, such as in a partially compiled form, or in any other desirable form.

The invention also targets a computer-readable recording medium or information medium containing instructions of a computer program such as mentioned above. The above-mentioned recording media may be any entity or device capable of storing the program. For example, the medium may comprise a storage means, such as a ROM, for example a CD-ROM or a microelectronic circuit ROM, or else a magnetic recording means, for example a hard disk. Moreover, the recording media may correspond to a transmissible medium such as an electrical or optical signal, which may be routed via an electrical or optical cable, by radio or by other means. The programs according to the invention may in particular be downloaded from an Internet network.

As an alternative, the recording media may correspond to an integrated circuit in which the program is incorporated, the circuit being designed to execute or to be used in the execution of the method in question.

This terminal, this card and this computer program have features and advantages analogous to those described above with reference to the method for making available electric charge.

LIST OF THE FIGURES

Other features and advantages of the invention will become more clearly apparent upon reading the following description of particular embodiments, provided by way of simple illustrative and non-limiting examples, and the appended drawings, in which.

Figure 5A:
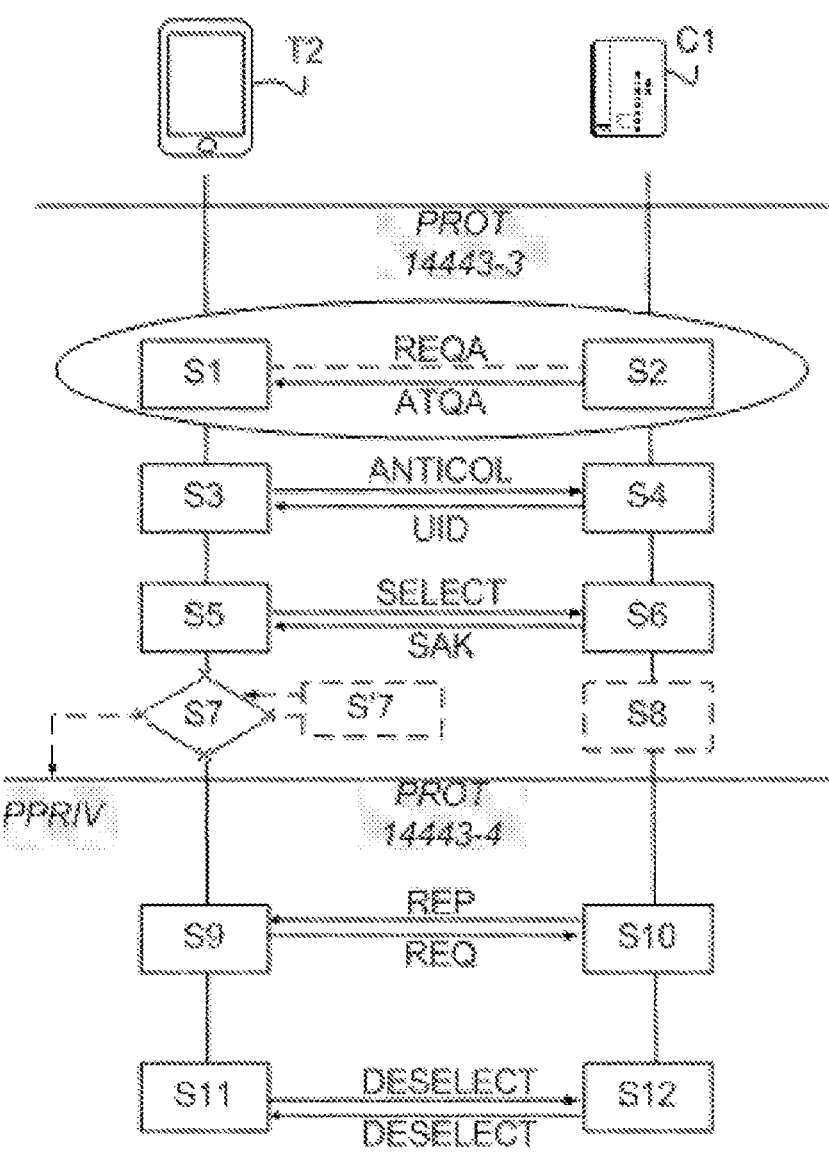
Figure 5B:
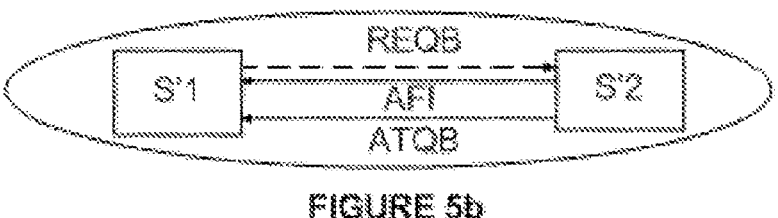

FIG. 5*a* illustrates steps of the charging method according to one embodiment of the invention, in the context of the ISO 14443 standard;

FIG. 5*b* illustrates steps of the charging method according to one embodiment of the invention, in the context of the ISO 14443 standard.

DESCRIPTION OF ONE EMBODIMENT OF THE INVENTION

General Principle of the Invention

The general principle of the invention consists in being able to charge, or recharge, an IBC card/tag for wireless communication using the human body as a channel, when it enters into the proximity of an NFC terminal, in order to make it autonomous enough to be used regularly by its carrier without the need for a specific charger.

Particular Embodiments of the Invention

Figure 1:
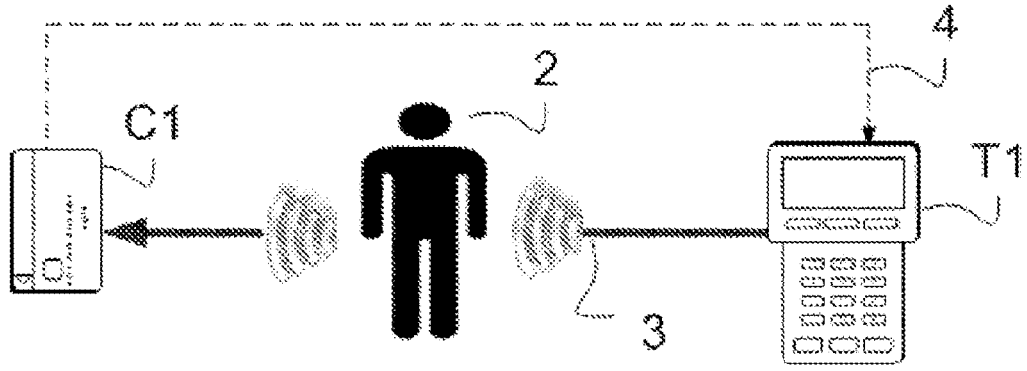
FIG. 1 illustrates the context of the invention.

FIG. 1 illustrates the context of the invention.

In this example, the user (2) carrying the card C1 equipped with an IBC module approaches until almost touching the reader terminal T1 in order to implement a service, for example a monetary transaction. The user (2), or carrier, of the IBC card is for example a human being, but could alternatively take the form of another living being able to perform an intentional gesture toward the reader and to transmit radio carrier waves. The terminals C1 and T1 are able to communicate in near-field mode via an electromagnetic field (NF, 3) using the body of the user.

The terminal (T1) may be for example an EPT (for Electronic Payment Terminal) comprising for example a user interface, also called HMI, intended to display messages for the attention of the user and possibly to receive data, or else a mobile terminal having an NFC module, a connected object (IoT), a personal computer, a computer mouse, a home gateway, etc. It is able to transmit NFC radio signals, through the body of the user, via an NFC/IBC antenna (not shown). In this example, the terminal (T1) comprises a surface formed by the antenna, which is possibly protected and designed to react when the user touches it or enters into proximity therewith, for example by bringing his hand close. The term "surface" is in no way limiting and is given by way of illustration, the antenna being the only means essential to the operation of the device.

The IBC card is a portable device that is naturally able to receive radio carrier waves, via an antenna, directly or through the body of the user (2). To this end, the card (C1) is located in the immediate proximity of the user (2), without necessarily being in direct contact therewith. For example, the card C1 is placed inside a pocket or a bag carried against the user, or around his neck. In these configurations, it is estimated that the card (C1) is not more than a few centimeters away from the body of the user (2). The distance is for example less than 5 cm. The card C1 is similar to a conventional electronic chip card comprising a passive "NFC tag", but it is equipped with a small rechargeable battery for autonomous operation. The battery will in particular be recharged when implementing the invention.

It will be noted that the card C1 shown here is an IBC card, but may also, in the context of the invention, take the form of an NFC card, or any device including an NFC card. In this case, the carrier conducts his transactions by physically bringing the NFC card toward the terminal, but the charging principle remains the same.

Figure 2:
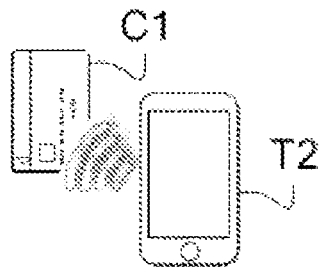
FIG. 2 illustrates one example of an environment for implementing the invention, according to one particular embodiment.

FIG. 2 illustrates one exemplary implementation of the invention according to one particular embodiment.

According to this embodiment, the carrier (re)charges his card using an NFC/IBC terminal, here a mobile terminal T2.

It will be recalled that NFC communications may cover two types of applications linked to two different operating modes on an NFC terminal:

The first mode, called emulation mode, emulates a near-field communication module in order to secure electronic transactions between an application stored on the terminal and an external reading terminal;

The second mode, called reader mode, relates to the reading of data on transponder devices, or NFC cards; this is the reader mode (tag reading) as defined by the NFC Forum (industrial organization responsible for promoting the implementation and standardization of NFC technology). NFC communication is established between a master, here the terminal, and a slave, for example a transponder. In this case, the terminal supplies power to the tag positioned in the electromagnetic field that it generates, through electromagnetic induction.

It is assumed here that the terminal T2 has activated its NFC module and has set itself to tag reading mode. From this time, it is listening for a transponder. It is therefore able to enter into communication with the NFC/IBC card acting as a transponder, and to supply power thereto. When the carrier of the card approaches the mobile, he immerses it in the electromagnetic field of the terminal. In response, the terminal may receive signals from the card.

A dialog is established between the card and the terminal, in accordance with the ISO/IEC 14443 standard. It will be recalled that the ISO 14443 standard describes the operation of NFC contactless chip cards. There are A and B variants of the standard, depending on the type of card used (Type A card or Type B card). This standard describes multiple layers (from 1 to 4). The main steps of initializing NFC communication between a transmitter and the card according to parts 3 and 4 (ISO 14443-3 and ISO 14443-4 of the standard) will be described later on with reference to FIGS. 5a and 5b. At the end of these steps of initializing communication, the transmitter, or mobile terminal according to the example, is able to read from and/or write to the contactless card. The invention, on the contrary, proposes to replace these read/write operations with an operation of supplying power to the card.

According to some embodiments of the invention, the card transmits a specific message to the terminal in order to notify it that it does not have to do anything, but simply remain in reader mode in order to supply power thereto. This specific message may additionally comprise optional fields intended to tell the terminal the time interval for which it should make the charge available, the way in which it should supply power to the card, etc. As an alternative, these optional data may be transmitted to the terminal in other messages following the first specific message.

This message may be inserted into a 14443-3 or 4 protocol, according to exemplary embodiments that will be described in more detail with reference to FIGS. 5a and 5b.

Figure 3:
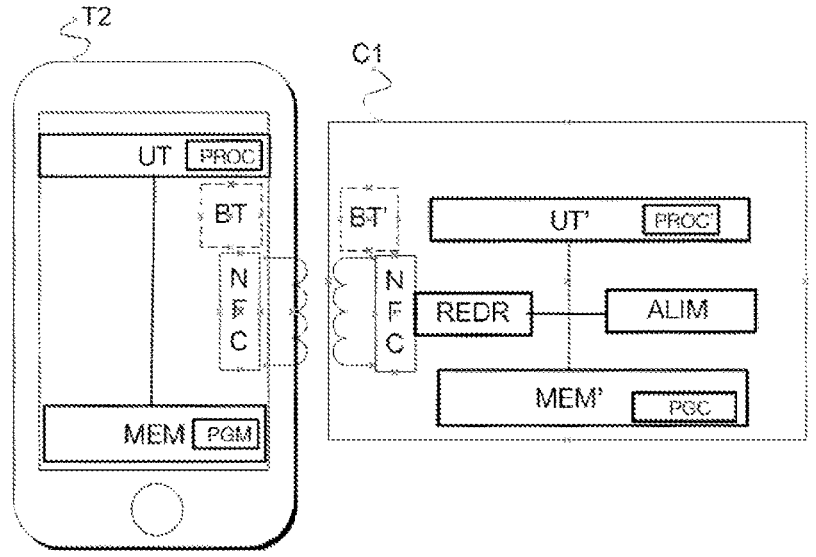
FIG. 3 illustrates an architecture of the terminals involved in a charging system according to one embodiment of the invention.

FIG. 3 illustrates an architecture of the terminals C1 (NFC/IBC card) and T2 (mobile terminal intended to supply power thereto) according to one particular embodiment of the invention.

The terminal T2 has the conventional architecture of a smartphone-type mobile telephone, and comprises in particular a memory MEM, a processing unit UT, equipped for example with a processor PROC, and driven by the computer program PGM stored in memory MEM. On initialization, the code instructions of the computer program PGM are for example loaded into a memory, before being executed by the processor PROC. The processor PROC of the processing unit UT in particular implements the steps of the method for making available electric charge according to any one of the particular embodiments described with reference to FIGS. 4, 5a and 5b according to the instructions of the computer program PGM.

The terminal also comprises control electronics for near-field communications, or an NFC module. The program PGM is for example a specific application, or applet, responsible for managing communication with the IBC card. It may be contained in the memory of the mobile terminal, or in that of a secure element (not shown) associated therewith. It may for example be an "Android" applet designed to run on mobiles equipped with this operating system. It may run in the background, or be launched manually by the user, or even be launched automatically when an IBC/NFC card is detected in the proximity of the terminal.

Optionally, the terminal also comprises a communication module distinct from the NFC module, for example Bluetooth (or Wi-Fi, Li-Fi, etc.), denoted BT in the figure.

The chip card C1 has the conventional architecture of a chip card equipped with an NFC module or tag and comprises in particular a memory MEM', a processing unit UT', equipped for example with a processor PROC', and driven by the computer program PGC stored in memory MEM'. On initialization, the code instructions of the computer program PGC are for example loaded into a memory, before being executed by the processor PROC'.

The processor PROC' of the processing unit UT in particular implements the steps of the charging method according to any one of the particular embodiments described with reference to FIGS. 4, 5a and 5b according to the instructions of the computer program PGC. The program PGC is in particular responsible for managing communication with the terminal and commanding adaptation for charging the power supply.

Control electronics for near-field communications, or an NFC module.

a power supply ALIM, which may take the form of a small battery, for example a conventional rechargeable 3 V lithium battery.

a rectifier circuit REDR capable of adapting the power supply offered to the battery so as to comply with the manufacturer's specifications. Such a circuit is within the scope of those skilled in the art. For example, the NFC antenna that receives the electromagnetic wave from the reader may be connected to a voltage rectifier. Once the voltage has been rectified and filtered, it may be applied to a regulator, for example a 2F33CV circuit from the company STMicroelectronics, in order to stabilize a voltage across the terminals of the battery.

Optionally, the card also comprises a communication module distinct from the NFC module, for example Bluetooth (or Wi-Fi, Li-Fi, etc.), denoted BT' in the figure, in order to communicate with the module BT of the terminal.

Figure 4:
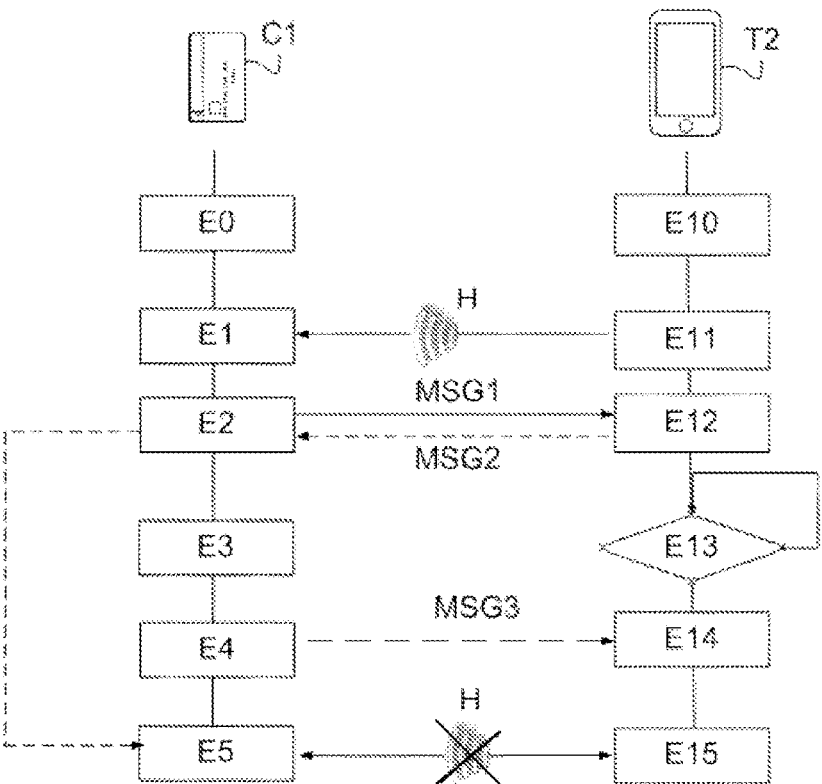
FIG. 4 illustrates steps of the charging method according to one embodiment of the invention.

FIG. 4 illustrates steps of the charging method according to one embodiment of the invention.

In a step E0, the card is brought toward the mobile. For example, it may be placed thereon. It enters the electromagnetic field generated by the terminal.

In a step E10 on the mobile, the application responsible for the IBC card (for example the applet PGM) is launched. It may be activated by the user, or run in the background on the mobile. If it was not already in reader mode, as introduced above, the mobile switches to this mode in a step E11. It will be noted that, by construction, if the terminal is a mobile telephone and observes a load variation at its NFC antenna, it automatically puts itself into reader mode. Moreover, readers that are not mobile are always set to this mode. The switch to reader mode may therefore be considered to be automatic. In card reader mode, the terminal generates an NFC magnetic field. Starting from this time, the standard protocol for initializing the exchange, described in the ISO 14443-3 and 14443-4 standards as described in more detail with reference to FIGS. 5a and 5b, is entered.

In step E2, the response from the card to the request from the mobile is transmitted from the card to the transmitter.

This response for example takes the form of a message MSG1. The purpose of this message is to tell the terminal that it does not have to do anything other than remain active in NFC reader mode. It may also comprise a certain number of parameters, such as for example the desired power supply duration (T, for example 5 minutes), the power required for the power supply, and any other parameter that might be useful for managing the charge.

According to one variant, this message may indicate that the card does not need to be (re)charged. To indicate that it does not need to be charged, the card may set itself to "invisible" mode, that is to say that it will not be detected by the reader. Any method within the scope of those skilled in the art for canceling out the mutual inductance that is normally established between the antennas of the terminal and of the card may be implemented.

According to one embodiment of the invention, the message MSG1 is transmitted from the card to the reader via the NFC communication established between the two devices. According to another embodiment of the invention, the message may be transmitted in Bluetooth or Wi-Fi mode or using any wireless protocol, on the condition that the card is equipped with the corresponding module.

The terminal receives this message in step E12 and may accordingly respond positively or negatively. In the case of a positive response, it may move to power supply step E13. In the case of a negative response, it may return a message MSG2 to the card, on a near-field channel or on a different channel using its module BT, optionally accompanied by a code indicating the reasons for its denial, for example:

the card is not authorized with the terminal because of its manufacturer, its type, the type of applications that it hosts, etc.

the terminal and the card are not pre-paired;

the parameters transmitted by the card with the message MSG1 do not correspond to the capabilities of the terminal;

the owner has prohibited the recharging of IBC cards;

the terminal does not have enough battery to access the request;

etc.

In a step E13, the mobile remains set to reader mode for a time that may, according to some variants, have been predefined on the terminal, received as a parameter of a message from the card, specified by a standard (for example the 14443 standard mentioned above), or computed based on previously received parameters (for example, in order to charge the card to 80%, knowing its battery features, the terminal T2 may compute that it should make the charge available for 3 minutes), etc.

According to one variant, the terminal may adapt, possibly over time, the charging power that is made available, for example by reducing the charging time if its own power supply drops below a charge threshold.

During this time, in step E3, the rectifier module of the card (REDR) transmits, to the power supply of the card, a rectified induced voltage and current that are intended to supply power thereto in order to charge or recharge it.

In step E4, an (optional) message is transmitted from the card to the transmitter. The purpose of this message is to tell the transmitter that it may stop supplying power to the card, for example because it has encountered an electrical problem (it is heating up, there is a problem with one of its components, etc.). This message may be transmitted on a near-field channel or on a different channel using its module BT'.

In step E15, the mobile stops supplying power to the card. If necessary, it deactivates it before stopping the power supply.

According to one variant, an end of charge indication may be rendered on the terminal (via its HMI).

In step E5, the card stops being supplied with power, and it may be removed from the proximity of the terminal.

FIG. 5a illustrates steps of the method for initializing and selecting a card by way of a terminal according to the ISO 14443 standard (parts 3 and 4) for a Type A card. This standard describes multiple communication layers. For more details, reference may be made to the ISO standards themselves, references:

14443-3—Identification cards-Contactless integrated circuit cards-Proximity cards-Part 3: Initialization and anticollision 14443-4—Identification cards-Contactless integrated circuit cards-Proximity cards-Part 4: Transmission protocol The main steps for initializing NFC communication between a transmitter and the card according to parts 3 and 4 of ISO 14443-3 and ISO 14443-4 are as follows, illustrated in FIG. 5a for a Type A card:

In steps S1/S2, the transmitter sends an identification request (called "REQA") and waits for a response (called "ATQA").

In steps S3/S4, a specific anticollision procedure makes it possible to link the transmitter to a single receiver, if multiple receivers are present in the field, and to receive the cards unique identifier (UID).

In steps S5/S6, the procedure for identifying the receiver is continued; at the end of this step, the transmitter is in possession of an identifier (SAK: "Select Acknowledge") of the card type, making it possible in particular to detect whether the receiver supports the ISO/IEC14443-4 communication layer.

Once communication has been established and the receiver has been identified, the application protocol associated with the receiver is used to communicate therewith; support for this protocol is tested in a step S7. The protocol that is used subsequently may be proprietary (denoted PPRIV in the figure) or of the ISO/IEC14443-4 type (denoted PROT 14443-4) defined by the standard if the card supports it.

One embodiment according to the invention consists in introducing, into one of the data transmitted by the card to the terminal, an indication according to which charging is requested. This corresponds to the message MSG1 of FIG. 4. According to one preferred embodiment, this indication will be inserted into an RFU (Reserved for future ISO/IEC use) field of the standard. The advantage of using an RFU field is that of not modifying the behavior of a card conforming to the 144443-3 protocol, but simply of appropriating a field that has been left free. A few possible variants are proposed below, the list of which is in no way limiting:

First Case: Information in the UID

According to a first case, the recharging request is transmitted in a field of the identifier UID. According to this first variant, the terminal that has detected a charging request in the UID may:

carry on waiting in step S7, that is to say not do anything for T seconds (step S'7);

at the end of step S7, enter into communication with the card via a level-4 private protocol and exchange additional information relating to the charge via this private protocol;

at the end of step S7, enter into communication with the card via the 14443-4 protocol and exchange additional information relating to the charge on this standardized protocol: required/granted charging time, required/granted charging power, etc.

Second Case: Specific Message in the 14443-4 Protocol

According to a second embodiment of the invention, the (re)charging request is transmitted by the card to the terminal on protocol level 4.

For example, if this is the 14443-4 protocol, it may be inserted in a specific message or, in a standard exchange of requests and responses (REQ/REP), use a particular coding of the "status word" field (SW1, SW2 in the standard) used in all responses.

FIG. 5b illustrates steps of the method for initializing and selecting a card by way of a terminal according to the ISO 14443 standard (parts 3 and 4) for a Type B card. A description is given here only of steps S'1 and S'2, which replace steps S1 and S2 described above. The subsequent steps (anticollision and selection) are implemented in a different way but lead, in the same way as in the previous case of the Type A card, to selection of the card that opens on a communication using a private protocol or a 14443-4 protocol. The same variants therefore apply as in the case of FIG. 5a.

In steps S' 1/S'2, the transmitter sends an identification request (called "REQB" or "WUPB") comprising an AFI field and waits for an ATQB response comprising, in return, an AFI field, coded on one byte. According to the above-mentioned 14443-3 standard, the application family identifier (AFI) represents the type of application targeted by the proximity coupler (here, the terminal) and makes it possible to preselect the proximity cards before the ATQB. Only proximity cards with applications of the type indicated by the AFI are authorized to respond to a REQB/WUPB command with an AFI other than "00". If the card conforms to the required AFI, it may respond with an "ATQB" response, itself comprising an "AFI" field in an "application data" field. An expedient combination of the fields that have been left free in the AFI (denoted RFU as above) makes it possible to indicate, according to one embodiment of the invention, a charging request; for example, in the response, it is possible to set:

The most significant nibble of the AFI to the value X=1111

The least significant nibble of the AFI to the value Y=T, where T codes for example the number of seconds of charge required.

Advantageously, such a combination makes it possible to transmit the charging request without modifying the conformity of the card with the 14443 standard.

It goes without saying that the embodiment that has been described above has been given purely by way of wholly non-limiting indication, and that numerous modifications may easily be made by those skilled in the art without, however, departing from the scope of the invention.

The invention claimed is:

1. A method for making available electric charge in order to charge an electronic card comprising a near-field communication module by way of a terminal, the method being implemented on the terminal, which is set to a near-field reader mode so as to generate an electromagnetic field able to charge the electronic card:

initializing a communication on a near-field channel between the terminal and the card, the terminal being configured to communicate wirelessly with the electronic card using a human body as part of the initialized near-field channel;

receiving a message from the card, said message containing at least one datum telling the terminal that the terminal should maintain the electric charge; and maintaining the electric charge while remaining in reader mode;

until an end of a first duration for which the electric charge should be maintained, or until obtaining a command to stop making the charge available; and then stopping making the charge available for the card.

2. The method for making available electric charge as claimed in claim 1, further comprising the terminal adapting a charging power that is made available.

3. The method as claimed in claim 1, wherein said message is received on a communication channel other than the near-field channel.

4. The method as claimed in claim 1, wherein said message is received from the card in near-field mode after a reinitialization of the card or in response to an initialization request from the card.

5. The method as claimed in claim 1, wherein said message is received, during a communication under an ISO 14443-3 communication standard between the card and the terminal, in a field that has been left free by the standard for future use.

6. The method as claimed in claim 1, wherein said message is received during a communication under an ISO 14443-4 communication standard between the card and the terminal.

7. A method for electrically charging an electronic card comprising a near-field communication module and a rechargeable battery by way of a terminal, which is set to near-field reader mode, the method being implemented on the card, when the card is located within the electromagnetic field generated by the terminal, and comprises:

initializing a communication on a near-field channel between the card and the terminal, the electronic card being configured to communicate wirelessly with the terminal using a human body as part of the initialized near-field channel;

transmitting a message to the terminal, said message containing at least one datum telling the terminal that the terminal should keep making electric charge available; and adapting a received charge in order to charge the battery; and transmit a first duration for which the electric charge should be maintained or a command to stop making the charge available for the card.

8. The method as claimed in claim 7, wherein said message is transmitted on a communication channel other than the near-field channel.

9. The method as claimed in claim 7, wherein said message is transmitted by the card in near-field mode after a reinitialization or in response to an initialization request from the card.

10. The method as claimed in claim 7, wherein said message is transmitted, during a communication under an ISO 14443-3 communication standard between the card and the terminal, in a field that has been left free by the standard for future use.

11. The method as claimed in claim 7, wherein said message is transmitted during a communication under an ISO 14443-4 communication standard between the card and the terminal.

12. A terminal comprising:

a near-field communication device, a memory and a processor that are configured so as, when the terminal is set to reader mode, in order to generate an electromagnetic field able to charge an electronic card comprising a near-field communication module, to:

initialize a communication on a near-field channel between the terminal and the card, the terminal being configured to communicate wirelessly with the electronic card using a human body as part of the initialized near-field channel;

receive a message from the card, said message containing at least one datum telling the terminal that the terminal should maintain the electric charge; and maintain the electric charge while remaining in reader mode:

until an end of a first duration for which the electric charge should be maintained, or until obtaining a command to stop making the charge available; and then stopping making the charge available for the card.

13. The terminal as claimed in claim 12, wherein said message is received on a communication channel other than the near-field channel.

14. The terminal as claimed in claim 12, wherein said message is received from the card in near-field mode after a reinitialization of the card or in response to an initialization request from the card.

15. The terminal as claimed in claim 12, wherein said message is received, during a communication under an ISO 14443-3 communication standard between the card and the terminal, in a field that has been left free by the standard for future use.

16. An electronic card comprising:

a near-field communication device-, a rechargeable power supply, an adaptation circuit, a memory and a processor that are configured so as, when the card is located within the electromagnetic field generated by a terminal, to:

initialize a communication on a near-field channel between the card and the terminal, the electronic card being configured to communicate wirelessly with the terminal using a human body as part of the initialized near-field channel;

transmit a message to the terminal, said message containing at least one datum telling the terminal that the terminal should keep making electric charge available;

adapt a received charge in order to charge the battery; and transmit a first duration for which the electric charge should be maintained or a command to stop making the charge available for the card.

17. The electronic card claimed in claim 16, wherein said message is received on a communication channel other than the near-field channel.

18. The electronic card claimed in claim 16, wherein said message is received from the card in near-field mode after a reinitialization of the card or in response to an initialization request from the card.

19. A non-transitory computer-readable medium comprising code instructions stored thereon, when the instructions is executed by a processor of a terminal, perform a method for making available electric charge in order to charge an electronic card comprising a near-field communication module by way of the terminal, the method being implemented on the terminal, which is set to a near-field reader mode so as to generate an electromagnetic field able to charge the electronic card:

initializing a communication on a near-field channel between the terminal and the card, the terminal being configured to communicate wirelessly with the electronic card using a human body as part of the initialized near-field channel;

receiving a message from the card, said message containing at least one datum telling the terminal that the terminal should maintain the electric charge; and maintaining the electric charge while remaining in reader mode:

until an end of a first duration for which the electric charge should be maintained, or until obtaining a command to stop making the charge available; and then stopping making the charge available for the card.

20. A non-transitory computer-readable medium comprising code instructions stored thereon, when the instructions is executed by a processor of an electronic card, which comprises a near-field communication module and a rechargeable battery, perform a method for electrically charging the electronic card by way of a terminal, which is set to near-field reader mode, the method being implemented on the card when the card is located within the electromagnetic field generated by the terminal, and the method comprising:

initializing a communication on a near-field channel between the card and the terminal, the electronic card being configured to communicate wirelessly with the terminal using a human body as part of the initialized near-field channel;

transmitting a message to the terminal, said message containing at least one datum telling the terminal that the terminal should keep making electric charge available;

adapting a received charge in order to charge the battery; and transmit a first duration for which the electric charge should be maintained or a command to stop making the charge available for the card.

* * * * *